No. 753,880. PATENTED MAR. 8, 1904.
J. C. W. GRETH.
WATER PURIFYING APPARATUS.
APPLICATION FILED OCT. 22, 1903.
NO MODEL.
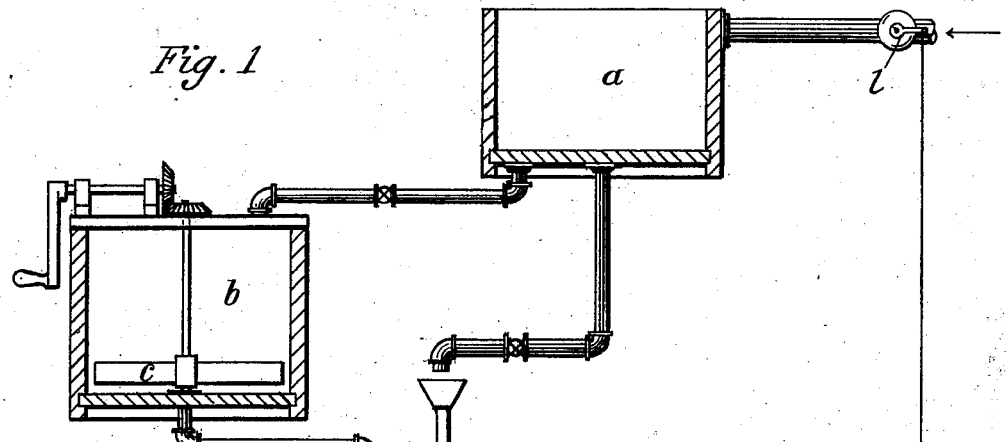
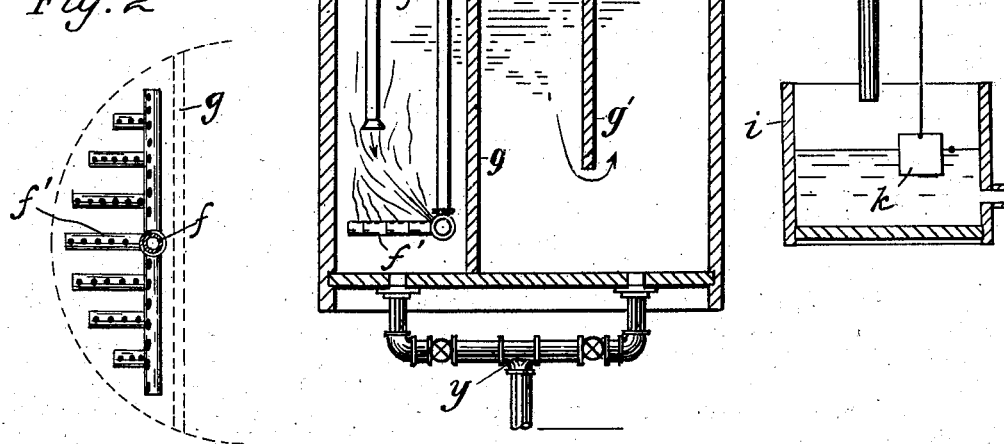
WITNESSES:
F. W. H. Clay
Chas. H. Ebert
INVENTOR:
John C. W. Greth
BY HIS ATTORNEY:
Paul Synnestvedt No. 753,880. Patented March 8, 1904.

UNITED STATES PATENT OFFICE.

JOHN C. W. GRETH, OF PITTSBURG, PENNSYLVANIA, ASSIGNOR TO WM. B. SCAIFE & SONS COMPANY, OF PITTSBURG, PENNSYLVANIA, A CORPORATION OF NEW JERSEY.

WATER-PURIFYING APPARATUS.

SPECIFICATION forming part of Letters Patent No. 753,880, dated March 8, 1904.

Application filed October 22, 1903. Serial No. 178,085. (No model.)

*To all whom it may concern:*

Be it known that I, JOHN C. W. GRETH, a citizen of the United States, residing at Pittsburg, in the county of Allegheny and State of Pennsylvania, have invented certain new and useful Improvements in Water-Purifying Apparatus, of which the following is a specification.

My invention relates to means for chemical treatment of water for precipitating or otherwise removing various impurities etc., and particularly to saturating tanks used for making hydrates or other solutions of chemicals with a definite solubility for this purpose. The objects of the invention are, to provide for a uniform and complete commingling of chemicals in the water; to provide a tank in which there is reverse upward and downward flow of current in order to assist in uniformly mixing the chemical in the same, to provide for complete saturation of the water irrespective of the volume, and to generally improve the structure and operation of saturating vessels for the purpose specified. These objects, and other advantages which will hereinafter appear, I attain by means of the construction illustrated in preferred form in the accompanying drawing, in which Fig. 1 shows a vertical central section through the apparatus, and Fig. 2 is a plan of the distributor $f'$ in Fig. 1.

In water purifying apparatus where it is customary to first mix with the stream of water a chemical such as hydrate of lime, in order to remove certain impurities, and afterwards to mix in the water other chemicals such as sodium carbonate, barium hydrate etc., for the purpose of precipitating the objectionable substances, it is extremely important that the first hydrate should be of a certain and uniform quality, as in the instance of hydrate of lime it must be always a saturated solution, whatever the rate of flow through the apparatus may be. For this purpose I provide the mixing tank $e$, as shown in the drawing, with a series of alternating partitions $g$, $g'$, which extend respectively from the bottom nearly to the top and from the top nearly to the bottom, in order to direct the current of water flowing through the tank, first upward, then downward in alternation, to the outlet $h$. This breaks up any possible strata due to different specific gravities and prevents any part of the water remaining quiescent or stagnant.

Water coming from the supply tank $a$ may be led into a slaking box $b$ for the caustic lime, and this is provided with a revolving vane $c$ therein, and with mechanical means outside to rotate the vane in order to thoroughly stir up the lime with the water to make cream of lime. This then flows out through the pipe $d$, as it is required, and then empties into the bottom of the first compartment, to be taken up by the water as fast as the water may take it.

In order to insure a thorough saturation, the raw water is lead in by pipe $f$ which empties through a distributer $f'$ under the cream of lime and the arrangement of the partitions causes the stream of water to rise through the lime, so that whatever may be the rate of flow there is opportunity for the water to take up all the calcium oxid necessary to make the saturated calcium hydrate. In the receiving vessel $i$ a device such as the float $k$ may be provided and connected to manipulate the cock $l$ in the feed pipe of the distributing tank of raw water, $a$. Thus the flow through the apparatus may be varied and automatically kept up, and at any rate of flow a perfect hydrate will be supplied at the outlet $h$. The other advantages of the devices will readily occur to those familiar with the art.

It will be understood of course, that the partitions $g$, $g'$ may be of any desired number, and they may be arranged in height or relative position to suit the form of tank, it being only necessary that in the flow through the tank the water rises and falls through approximately the depth of the tank. The same devices may be used for other chemicals and in other parts of filtering apparatus, but I find it most useful in making a solution of chemicals of definite solubility such as calcium oxid, in which case it is evident that any surplus in the mechanical mixture may be precipitated, and an exactly saturated solution will be discharged from the outlet.

Having thus described my invention and illustrated its use, what I claim as new, and desire to secure by Letters Patent, is the following:

1. In water purifying apparatus a saturating tank provided with a series of partitions attached alternately to the bottom and to the top respectively, and open near the opposite side, so as to cause the water flowing through the tank to take an inverse upward and downward course and means for introducing the chemical at the bottom of the compartment therein, substantially as described.

2. In a saturating tank, an inlet pipe for the water opening near the bottom of the tank, an inlet pipe for the lime opening also near the bottom of the tank but above the mouth of the water pipe, and a partition in said tank to cause the flow from the water pipe to pass upward through the collected cream of lime therein.

3. In a saturating tank the combination with an inlet pipe for the chemical, an inlet pipe for the raw water emptying into the tank below the mouth of the chemical pipe, and a series of alternating partitions in said tank, of which some are closed at the bottom and open near the top of the tank and others closed at the top and opened near the bottom.

4. A saturating tank having a series of partitions causing a vertically reversed flow therethrough, a water inlet pipe having a distributer opening near the bottom in one of the compartments and an inlet for the chemical directly above the water inlet, whereby the stream of water is forced to rise through the chemical for the purpose of saturating, as described.

5. In water purifying apparatus, the combination with a supply tank and a box for the mixture of chemical reagents, of a saturating tank provided with a partition extending from the bottom to near the top and another partition extending from the top to near the bottom, an inlet pipe for the water opening into the bottom of the first compartment of the tank and an inlet pipe from the mixer opening near the bottom of the tank but above the opening of the water inlet pipe, substantially as described.

In testimony whereof I have hereunder signed my name in the presence of the two subscribed witnesses.

JOHN C. W. GRETH.

Witnesses:
F. W. H. CLAY,
CHAS. H. EBERT.